US012598208B2

(12) United States Patent
    Ragula et al.

(10) Patent No.: US 12,598,208 B2
(45) Date of Patent: Apr. 7, 2026

(54) INFRASTRUCTURE AS CODE (IaC) SCANNER FOR INFRASTRUCTURE COMPONENT SECURITY

(71) Applicant: Zscaler, Inc., San Jose, CA (US)

(72) Inventors: Jeevan Reddy Ragula, Hyderabad (IN); Abhijeet Singh Rawat, Hyderabad (IN); Shyam Baitmangalkar, Hyderabad (IN); Aparna Saripaka, Hyderabad (IN); Robert Valek, Odessa (UA); Oleksii Stetsyk, Kyiv (UA)

(73) Assignee: Zscaler, Inc., San Jose, CA (US)

( * ) Notice: Subject to any disclaimer, the term of this patent is extended or adjusted under 35 U.S.C. 154(b) by 265 days.

(21) Appl. No.: 18/461,181

(22) Filed: Sep. 5, 2023

(65) Prior Publication Data

US 2025/0030722 A1      Jan. 23, 2025

(30) Foreign Application Priority Data

Jul. 20, 2023    (IN) ............................. 202311049062

(51) Int. Cl.
    *H04L 9/40* (2022.01)
(52) U.S. Cl.
    CPC ........ *H04L 63/1433* (2013.01); *H04L 63/102* (2013.01); *H04L 63/20* (2013.01)
(58) Field of Classification Search
    CPC .... H04L 63/1433; H04L 63/102; H04L 63/20
    See application file for complete search history.

(56) References Cited

U.S. PATENT DOCUMENTS

| | | | |
|---|---|---|---|
| 8,561,180 B1 * | 10/2013 | Nachenberg | G06F 21/562 |
| | | | 726/22 |
| 9,753,834 B1 * | 9/2017 | Tang | G06F 11/3692 |
| 10,379,966 B2 | 8/2019 | Gangadharappa et al. | |
| 10,432,651 B2 | 10/2019 | Pangeni et al. | |
| 10,796,017 B1 * | 10/2020 | Azaroff | H04L 63/0853 |
| 10,958,556 B2 * | 3/2021 | Rajalingam | H04L 41/0631 |
| 11,113,177 B1 * | 9/2021 | Chitnis | H04L 67/564 |
| 11,397,808 B1 * | 7/2022 | Prabhu | G06F 21/566 |
| 12,355,626 B1 * | 7/2025 | Varakantam | G06F 16/9535 |
| 2004/0128653 A1 * | 7/2004 | Arcand | G06F 11/3688 |
| | | | 717/124 |
| 2006/0048224 A1 * | 3/2006 | Duncan | G06F 21/6218 |
| | | | 726/22 |
| 2017/0359220 A1 | 12/2017 | Weith et al. | |
| 2018/0027006 A1 * | 1/2018 | Zimmermann | H04L 63/0227 |
| | | | 726/11 |
| 2020/0162497 A1 * | 5/2020 | Iyer | H04L 63/164 |
| 2021/0126949 A1 * | 4/2021 | Nadgowda | H04L 63/1433 |
| 2021/0336934 A1 | 10/2021 | Deshmukh et al. | |
| 2022/0046059 A1 | 2/2022 | Pandurangi et al. | |

(Continued)

*Primary Examiner* — Jason Chiang
(74) *Attorney, Agent, or Firm* — Baratta Law PLLC; Lawrence A. Baratta, Jr.; Ryan Odessa

(57) ABSTRACT

Systems and methods for an Infrastructure as Code (IaC) scanner for infrastructure component security. Various embodiments include steps of receiving one or more files for security scanning; extracting and parsing one or more resources from the one or more files; evaluating one or more policies for each of the one or more resources thereby ensures that underlying infrastructure components are configured securely; and displaying findings and details associated with the evaluating of the one or more resources.

18 Claims, 9 Drawing Sheets

(56)          References Cited

U.S. PATENT DOCUMENTS

| | | | |
|---|---|---|---|
| 2022/0094810 A1* | 3/2022 | Tajima | H04N 1/32368 |
| 2022/0129417 A1* | 4/2022 | Diaz | G06F 21/562 |
| 2022/0329442 A1 | 10/2022 | Bulusu et al. | |
| 2022/0393941 A1 | 12/2022 | Singh | |
| 2022/0393943 A1 | 12/2022 | Pangeni et al. | |
| 2022/0394083 A1 | 12/2022 | Pangeni et al. | |
| 2023/0015603 A1 | 1/2023 | Smith | |
| 2023/0019448 A1 | 1/2023 | Deshmukh et al. | |
| 2024/0086157 A1* | 3/2024 | Patil | G06F 8/34 |
| 2024/0171466 A1* | 5/2024 | Kandasamy | H04L 41/0886 |
| 2024/0250970 A1* | 7/2024 | Lai | H04L 63/1416 |
| 2024/0281248 A1* | 8/2024 | Shah | G06F 8/77 |
| 2024/0388600 A1* | 11/2024 | Du | H04L 63/1416 |
| 2024/0430303 A1* | 12/2024 | Lu | H04L 63/20 |

* cited by examiner

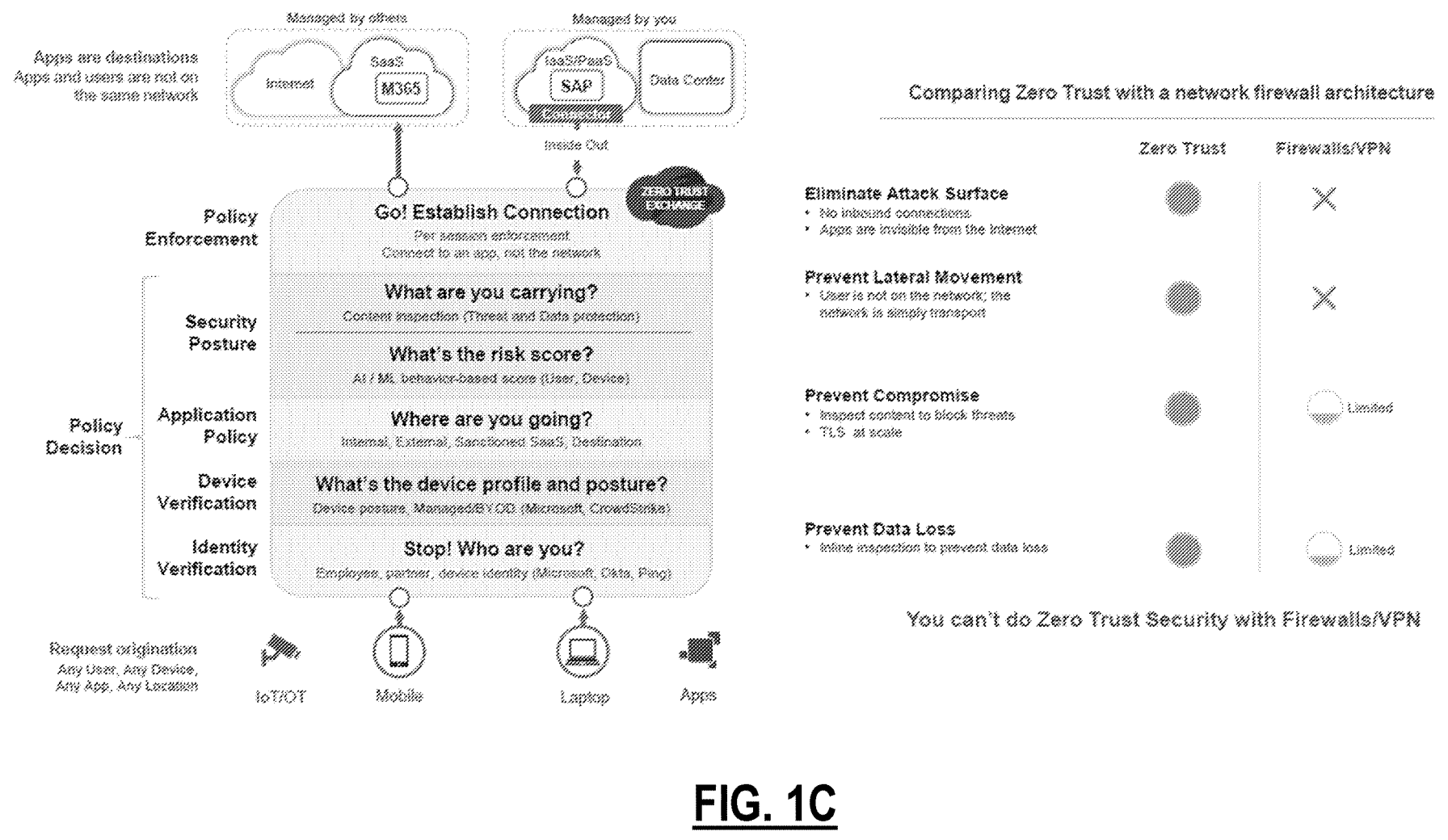

Comparing Zero Trust with a network firewall architecture

| | Zero Trust | Firewalls/VPN |
|---|---|---|
| Eliminate Attack Surface<br>· No inbound connections<br>· Apps are invisible from the Internet | ● | X |
| Prevent Lateral Movement<br>· User is not on the network, the network is simply transport | ● | X |
| Prevent Compromise<br>· Inspect content to block threats<br>· TLS at scale | ● | Limited |
| Prevent Data Loss<br>· Inline inspection to prevent data loss | ● | Limited |

You can't do Zero Trust Security with Firewalls/VPN

Managed by you
Data Center
IaaS/PaaS
SAP

Managed by others
SaaS
M365
Internet

Inside Out

Policy Enforcement
Go! Establish Connection
the session enforcement
Connect to an app, not the network

Security Posture
What are you carrying?
Content inspection (Threat and Data protection)

What's the risk score?
AI / ML, behavior-based score (User / Device)

Application Policy
Where are you going?
Internal, External, Sanctioned SaaS, Destination

Device Verification
What's the device profile and posture?
Device posture, Managed by 2D, Microsoft, Crowdstrike

Identity Verification
Stop! Who are you?
Employee, partner, device identity (Microsoft, Okta, Ping)

Policy Decision

Request origination
Any User, Any Device,
Any App, Any Location

Apps are destinations
Apps and users are not on
the same network

IoT/OT    Mobile    Laptop    Apps

FIG. 1C

INFRASTRUCTURE AS CODE (IaC) SCANNER FOR INFRASTRUCTURE COMPONENT SECURITY

FIELD OF THE DISCLOSURE

The present disclosure relates generally to networking and computing. More particularly, the present disclosure relates to systems and methods for an Infrastructure as Code (IaC) scanner for infrastructure component security.

BACKGROUND OF THE DISCLOSURE

During the development process, Infrastructure as Code (IaC) files can inadvertently include vulnerabilities. These vulnerabilities can go undetected during the development process and cause issues and risk to associated infrastructure. Because of this, it is crucial to ensure that underlying infrastructure components, such as cloud services or virtual machines, are configured securely. Various embodiments of the present disclosure provide an IaC scanner to detect security violations in IaC deployment files on developer machines. These scans can be performed automatically as part of the development pipeline, allowing security issues to be identified and resolved quickly, thus reducing the risk of security incidents, and increasing compliance.

BRIEF SUMMARY OF THE DISCLOSURE

In an embodiment, the present disclosure includes a method with steps, a cloud-based system configured to implement the steps, and a non-transitory computer-readable medium storing computer-executable instructions for causing performance of the steps. The steps include receiving one or more files for security scanning; extracting and parsing one or more resources from the one or more files; evaluating one or more policies for each of the one or more resources, thereby ensuring that underlying infrastructure components are configured securely; and displaying findings and details associated with the evaluating of the one or more resources.

The steps can further include wherein the one or more files are received from a user, wherein the steps further include authenticating the user prior to the receiving. Resources can be stored in a database prior to the evaluating. The database can be created when the one or more files are received. The one or more files include one or more Infrastructure as Code (IaC) files. The one or more policies can be maintained as Structured Query Language (SQL) expressions in a database. The SQL expressions are derived from policy definitions retrieved from a posture control platform in a cloud-based system. Results of the evaluating can be persisted in a database. The findings and resources can be uploaded to a posture control platform for display and further processing. The findings include security issues associated with the one or more resources, and the details include recommended and remedial procedures for the security issues.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1C is a logical diagram illustrating zero trust policies with the cloud-based system and a comparison with the conventional firewall-based approach.

FIG. 4 is a block diagram of a user device, which may be used with the cloud-based system or the like.

DETAILED DESCRIPTION OF THE DISCLOSURE

Cloud-based security solutions have emerged, such as Zscaler Internet Access (ZIA) and Zscaler Private Access (ZPA), Zscaler Posture Control (ZPC), etc., all available from Zscaler, Inc., the applicant and assignee of the present application. ZPC is a Cloud Native Application Protection Platform (CNAPP) that correlates across multiple security engines to prioritize hidden risks caused by misconfigurations, threats, and vulnerabilities across the entire cloud stack, reducing cost, complexity, and cross-team friction.

Example Cloud-Based System Architecture

Figure 1A:
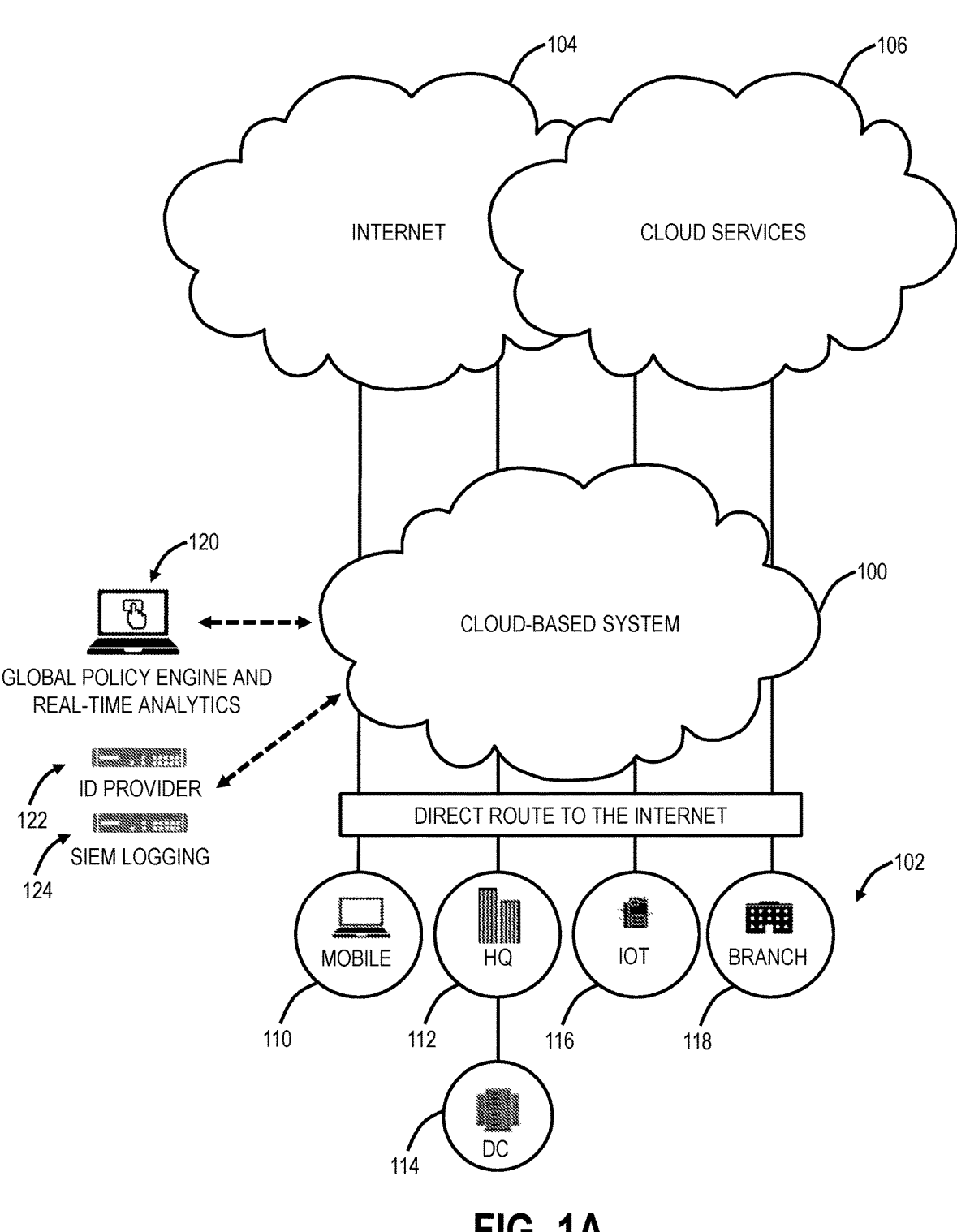
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 4:
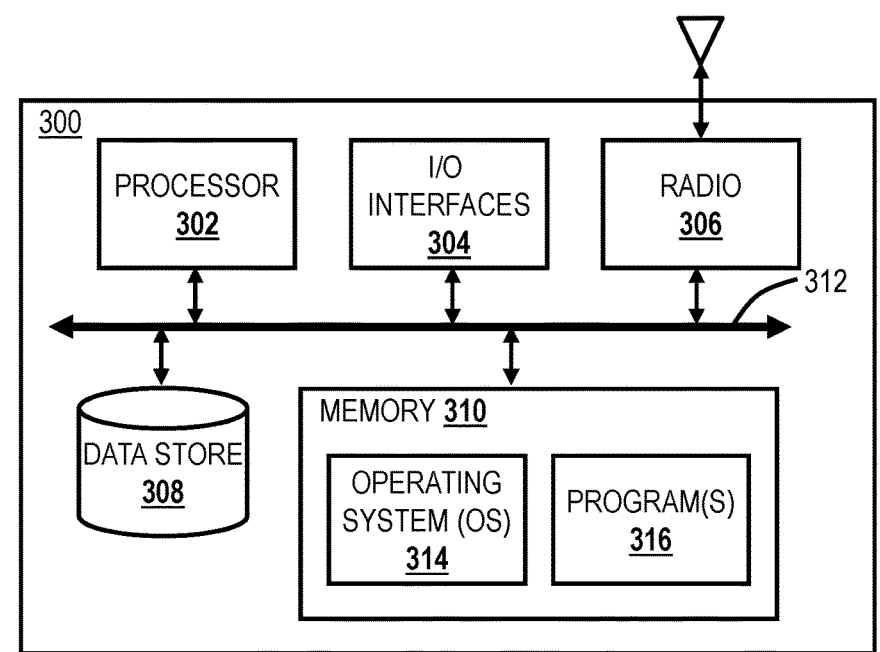

For illustration purposes, the users 102 of the cloud-based system 100 can include a mobile device 110, a headquarters (HQ) 112 which can include or connect to a data center (DC) 114, Internet of Things (IOT) devices 116, a branch office/remote location 118, etc., and each includes one or more user devices (an example user device 300 is illustrated in FIG. 4). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes— they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

Figure 1B:
FIG. 1B is a logical diagram of the cloud-based system operating as a zero-trust platform.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.
Zero Trust FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
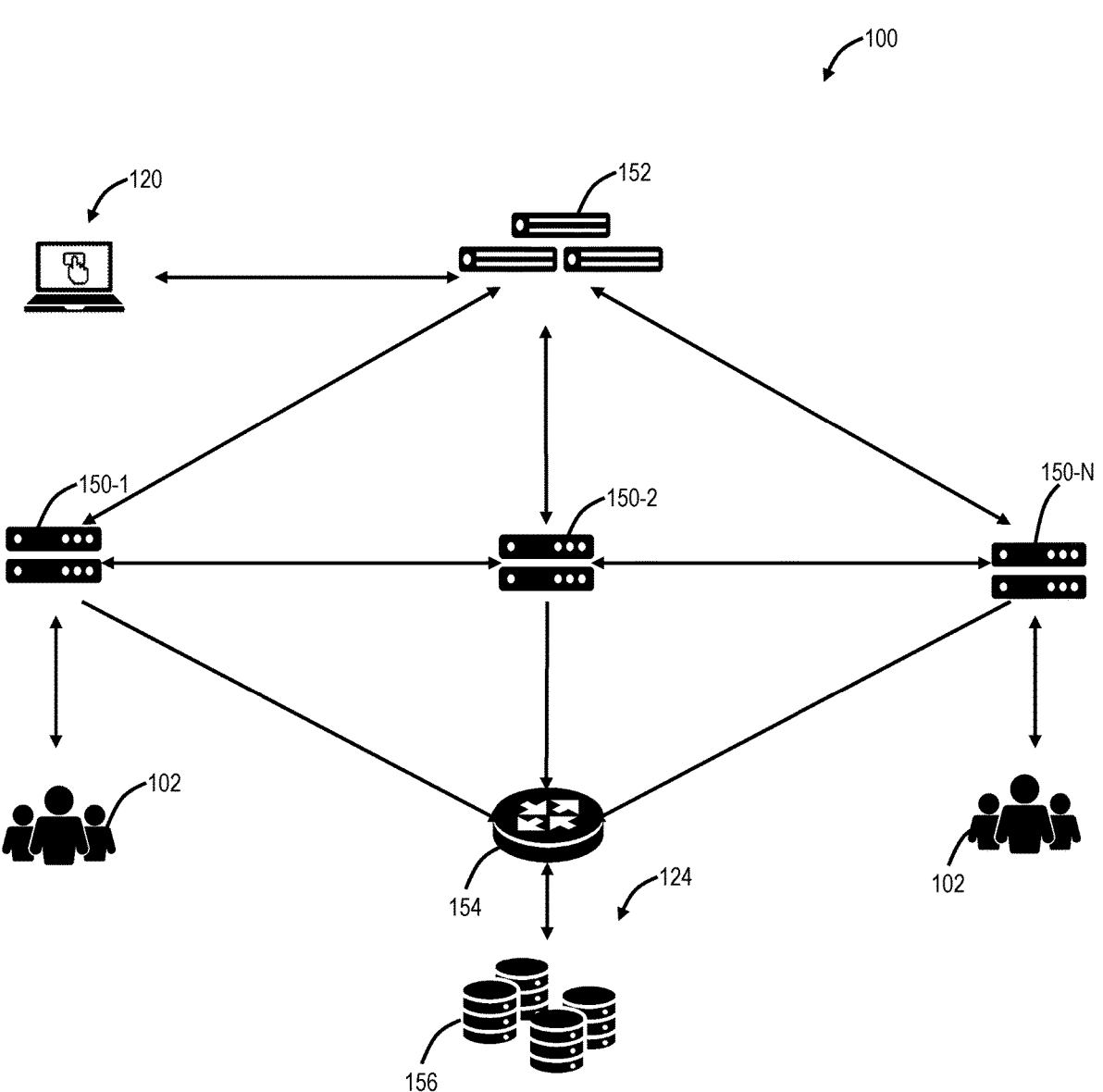
FIG. 2 is a network diagram of an example implementation of the cloud-based system.
Figure 3:
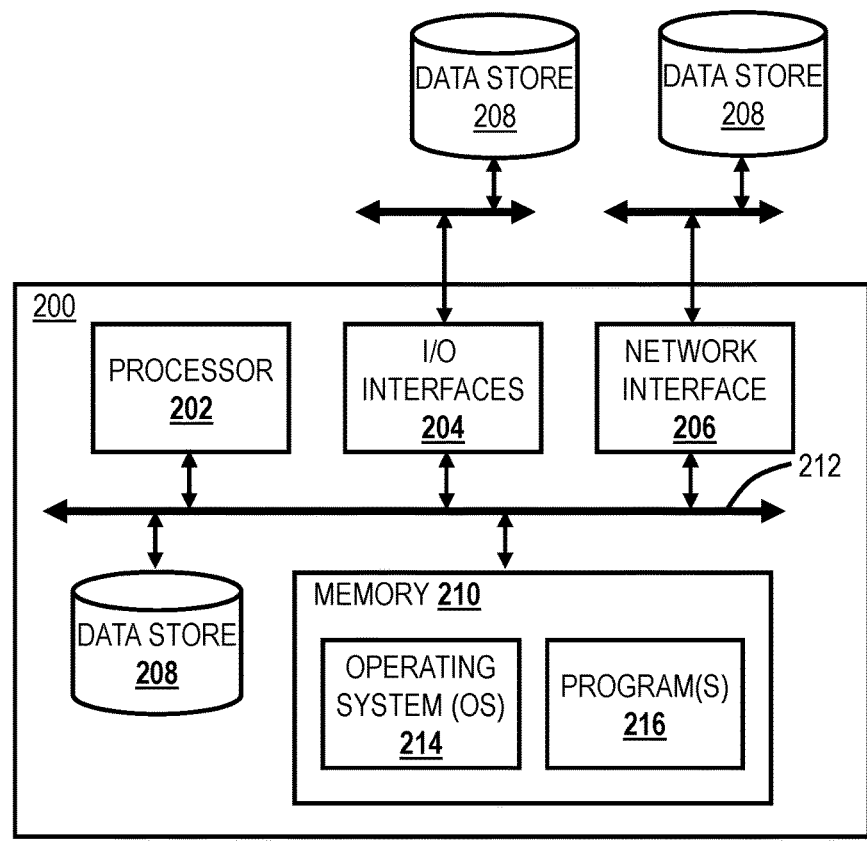
FIG. 3 is a block diagram of a server, which may be used in the cloud-based system, in other systems, or standalone.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 3. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above. The service edge node 150 can also be a Secure Access Service Edge (SASE).

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IOT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Zero Trust Network Access Using the Cloud-Based System

Figure 5:
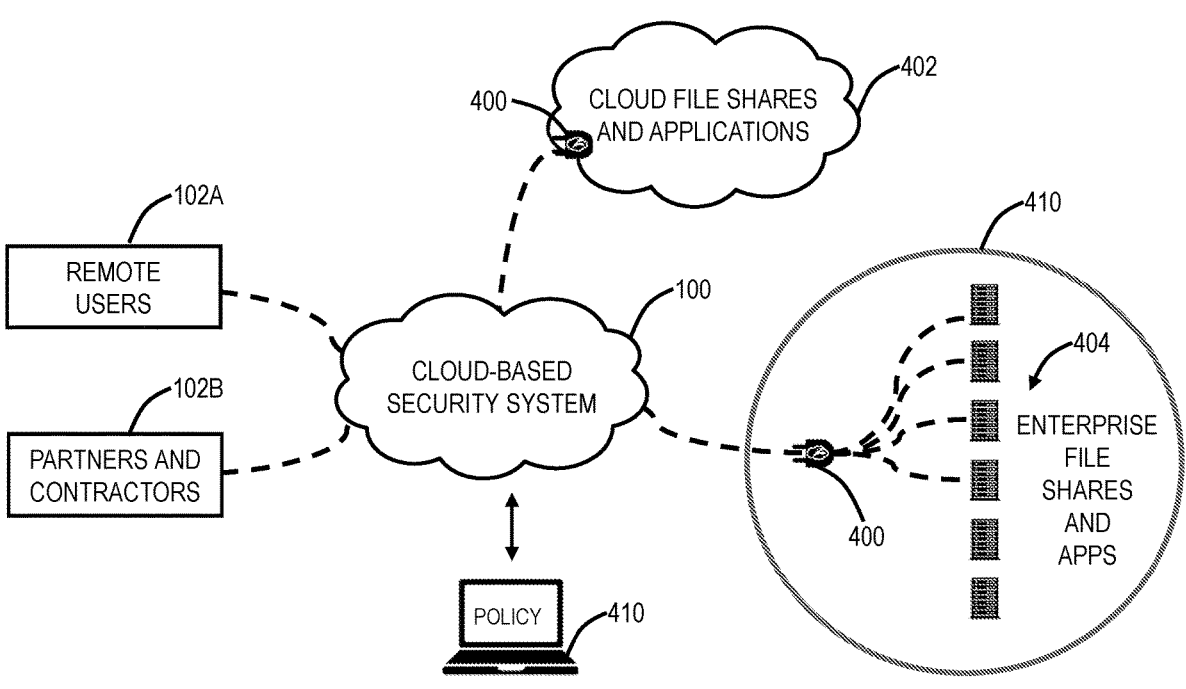
FIG. 5 is a network diagram of a Zero Trust Network Access (ZTNA) application utilizing the cloud-based system.

FIG. 5 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by an application 350 on the user device 300. Also, the applications 402, 404 can include B2B applications. Note, the difference between the applications 402, 404 is the applications 402 are hosted in the cloud, whereas the applications 404 are hosted on the enterprise network 410. The services described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

§ 6.0 Digital Experience Monitoring

Figure 6:
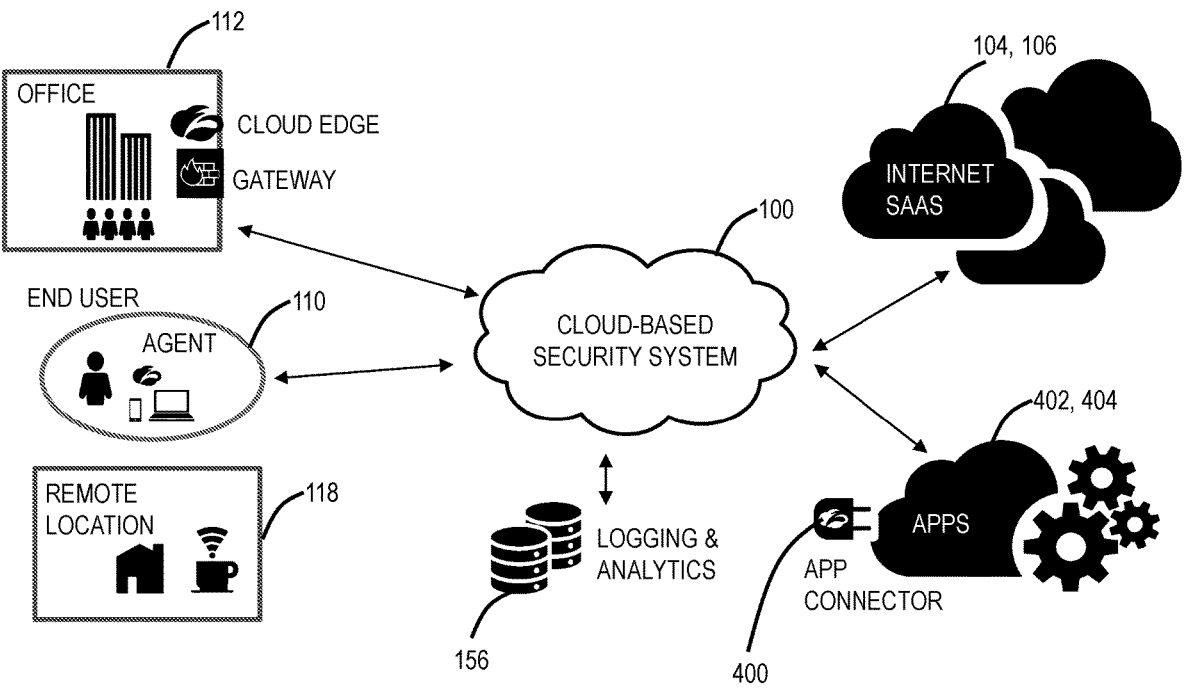
FIG. 6 is a network diagram of the cloud-based system in an application of digital experience monitoring.

FIG. 6 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

| Application-related data | |
| --- | --- |
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

| Network-related data | |
| --- | --- |
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

| Device-related data (endpoint-related data) | |
| --- | --- |
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

Posture Control

Various embodiments utilize posture control, also referred to as a Cloud-Native Application Protection Platform (CNAPP). Various embodiments provide cloud-native application security as an agentless solution that utilizes machine learning to correlate hidden risks caused by misconfigurations, threats, and vulnerabilities across the cloud-based system. Thus, security and development teams can prioritize and remediate risk associated with cloud-native applications as early as possible. Present solutions provide a comprehensive cloud security solution for all applications running on any service in the cloud-based system.

Cloud transformation introduces risks and security challenges to customers' security postures. Developers and infrastructure teams utilizing agile application development and deployment often overlook traditional security checks. Associated risks are further amplified by the fact that there can be hundreds of cloud services across a plurality of clouds, and no cloud service provider has the same capabilities. This makes it extremely difficult to maintain consistent zero trust security controls across the various clouds and workloads running in the multiple clouds.

Another issue faced by cloud security is the fact that most customers suffer from limited, or a lack of, visibility into what is running in the cloud. This includes limited visibility into where critical data is stored, what identities can access the critical data, and if any vulnerabilities exist in their code, applications, or cloud configurations. Various solutions to such problems have included bombarding operations teams with alerts, making it difficult and time-consuming to fine and resolve important issues.

Various embodiments discover all assets for misconfiguration, vulnerabilities, and noncompliance. The use of machine learning and advanced threat correlation allows prioritization of high-impact risks. Embodiments further optimize responses with rich context, actionable information, automated guardrails, and step-by-step guided remediation. To comply with internal and external policies, various methods utilize preconfigured security policies and compliance libraries. Additionally, present systems can integrate with various ecosystems to enhance cross-collaboration and communication of threat remediation. A unified posture control platform can consolidate security stacks by replacing multipoint solutions with the present systems and methods.

Comprehensive coverage eliminates overhead, and risk associated with disconnected point solutions by utilizing the present unified CNAPP. The unified CNAPP converges Cloud Security Posture Management (CSPM), Cloud Infrastructure Entitlement Management (CIEM), Configuration Management Database (CMDB), and Cloud Workload Protection Platform (CWPP) alongside Infrastructure as Code (IaC) security, vulnerability management, and compliance management.

Various embodiments are adapted to uncover combinations of misconfigurations or activities that are seemingly low-risk in isolation, but together can create a real risk. Systems can additionally automatically prioritize correlated risks to improve Security Operations Center (SOC) efficiency and reduce alert fatigue. In order to identify and prioritize risk, embodiments of CNAPP are adapted to scan container images in registries and VMs in production environments.

Various embodiments include integration of CNAPP into development platforms (for example, VS Code), development operations tools (for example, GitHub and Jenkins), and security ecosystems (for example, ServiceNow, JIRA, and Splunk) to provide visibility, alerting, and control from early stages of builds to run stages. Similarly, embodiments of CNAPP are adapted to monitor automated deployment processes and send alerts when they identify critical security issues.

Embodiments of CNAPP can integrate with various cloud environments from a plurality of cloud providers (i.e., Amazon Web Services (AWS), Microsoft Azure, Google Cloud, etc.) and development operations tools to provide the various features of the present disclosure.

Posture control provides an integrated security platform from build to run. Various cloud security challenges include rapidly expanding workloads across a plurality of cloud platforms. Multiple point products and poor integrations can lead to data loss (i.e., CSPM, CIEM, IaC Scanning, DLP, etc.). Also, providing too many alerts and no context can make it difficult to identify true risk. Posture control can provide exposure scanning to identify exposed assets and vulnerabilities (attack surfaces) and discover sensitive data. Configuration scanning allows posture control to identify and prioritize misconfigurations and identify excessive permissions for users and workloads. For example, identifying a user or workload having excessive permissions when the user or workload is deemed to be suspicious or risky. The present zero trust architecture securely connects users to applications, applications to applications, and machines to machines over any network in any location.

Discovery

Various embodiments of the posture control process include discovering raw information (posture control data) across multi-cloud and public cloud environments to produce correlative cloud security analytics. Such discovering can be a result of the scanning disclosed herein. For the discovery stage to operate, various embodiments allow onboarding and configuring of modules for automated discovery of all assets, identities, network flow logs, and activities in a particular public cloud environment. For IaC discovery, embodiments of posture control allow its customers to onboard code repositories and CI/CD tools hosted as SaaS services or self-hosted on on-premise environments. The discovery of data (i.e., assets, identities, network flow logs, activities, code repositories, CI/CD tools, configurations, etc.) can alternatively be referred to as scanning for or discovering posture control data. IaC code repositories and CI/CD environments are also referred to as build-time environments, whereas public cloud environments are referred to as run-time cloud environments. The various configurations of automated discovery can additionally be referred to as discovery modules.

Various embodiments allow configurable parameters for all discovery modules to collect changes at preconfigured intervals. Various configurable discovery module parameters include minimum time-frequency to collect ongoing changes, maximum time-frequency to collect ongoing changes, and stop collection of data in any discovery module at a preconfigured date and time. The various discovery modules enable a plurality of ways to collect (scan for) data from customers' environments and allow various modes of collection. In some embodiments, the modes of collection include APIs exposed to public cloud vendors and SaaS service providers for code repositories and CI/CD tools. Additionally, file transfers via HTTPS from public cloud storages and data lakes are also contemplated. In various embodiments, collection/scanning of data includes fully agentless scanning.

Findings

In various embodiments, multi-cloud Configuration Management Databases (CMDBs) provide current and historical configurations of all things uniquely identifiable in the public cloud (run-time cloud) environments. Historical configurations can be identified up to a preconfigured historical date (i.e., 180 days prior), while current configurations are updated in real-time. Further, various features include identifying activities performed by identities across all public cloud environments. This similarly provides a historical view of activities performed by human or non-human identities present in Identity and Access Management (IAM) catalogs of native public cloud environments. Visualizations can show a timeline of activities associated with an identity. Such visualizations can provide the ability to search assets based on tags, regions, etc. They also provide the ability to view and download metadata, understand who changed what and when, and perform investigations by correlating events with alerts. Such investigations help to understand associated assets with their relationship, understand who has access to what and how, and visualize such relationships, alerts, and vulnerabilities in graphical representation.

Additionally, cloud infrastructure entitlement management provides a relationship between human and non-human identities including their authorization permissions to perform various actions in public cloud environments. The various data ingested from discovery modules can be aggregated to analyze transport layer communication in public clouds. Security policy findings modules can detect invalid configurations in run-time or build-time environments based on user preferences and rules enabled from pre-configurations in posture control systems.

In run-time environments, posture management can identify misconfiguration issues to provide compliance risks in the cloud. It can also be enabled to provide continuous monitoring and real-time security postures of individual compliance benchmarks based on data collected at set time intervals from the various discovery modules.

Cloud security posture management identifies misconfiguration issues in build-time environments to provide compliance risks before asset/changes are deployed to the cloud environment via scripts in the code repositories. Further, posture control provides continuous monitoring and real-time security postures of individual compliance benchmarks based on the changes made in code repositories, CI/CD tools and data ingested at set intervals from the discovery modules.

Correlation

The various findings and discovery modules disclosed herein include correlated policies and alerts. Based on the invalid findings and risks determined by security policy findings, the correlated policies allow systems to generate alerts on the uniquely identifiable resources from the various multi cloud CMDBs. Alert rules can be configured as to receive a subset of required alerts on one or more configured communication channels (i.e., internet based messaging platforms, Short Messaging Service (SMS), Email, etc.).

Various examples of correlated policies include an instance with powerful access permissions that is exposed to the public. Compromising such an instance can give an attacker a wide attack surface and access to resources. An attacker can gain access to the instance because it is exposed to the internet, and can thus access resources due to instance privileges. An instance such as this with high privileges has a higher impact if it is compromised. Another example includes creating credentials for a privileged service principal, which is seen as a risky activity. Various rules can detect when credentials are created for a privileged service principal, because the credentials can be used to access an account from the internet, thus bypassing authentication controls. Further, rules can detect when a bucket object level encryption key is set to an external key. If the external key is owned by an attacker, the attacker can later block access to the key and lockout the bucket owner from accessing the objects. It will be appreciated that the examples set forth in the present disclosure are non-limiting, and other rules and correlations are contemplated by various embodiments.

Analytics

Various embodiments of posture control can provide informative analytics which include high impact risk correlation and timelines across all discovery modules. As stated previously, embodiments of the present disclosure are adapted to monitor compliance via various compliance policies. In various embodiments, continuous compliance posture tracking takes place. A GUI provides the ability to view the continuous tracking and graphically view policy compliance trends over a period of time. The visualization can include one or more graphs representing policy compliance posture, policy compliance trends, and the like.

The data displayed in GUIs can include data enriched identity inventory for the cloud environment. This provides visibility of human and non-human identities, allows an understanding of identity origin for local/federated/external identities, and catalogs human and non-human identities by their permission levels in different accounts. Further, the data can allow easy detection of highly privileged identities and allow assessment of their permissions. All implicit and explicit entitlements can be identified. Also, excessive permissions assigned to non-human identities can be detected. A risk based prioritized view can allow visualization of only important high risk issues as well as identities which are considered high risk, thus reducing the number of alerts an operations team has to deal with.

The security exposure provides complete security posture coverage and eliminates bombardment of alerts via smart policies for simple and advanced attack vectors. They can further be categorized for ease of access and follow-up.

IaC Scanner

The present disclosure provides an Infrastructure as Code (IaC) scanner for scanning particular directories or files supplied by developers for providing reports based on the findings of the files. This is done by utilizing a parser and an inline policy evaluation engine. Various components for performing the present methods include a scanner command line tool or Command Line Interface (CLI), IaC parsers for Terraform, Cloud Formation, Azure Resource Manager, Helm, and Kubernetes Templates, and a policy engine. The IaC scanner is adapted to detect security violations in IaC deployment files on developer machines. This ensures that the underlying infrastructure components are configured securely. These infrastructure components can include cloud services, virtual machines, etc. These systems and methods aim to prevent unauthorized access or changes to infrastructure, ensure data privacy and protection, and meet compliance requirements.

The IaC scanner can be initially authenticated by utilizing posture control platforms, such as the posture control systems and methods disclosed herein. This can be done by opening a posture control portal, where a developer is instructed to supply credentials, and once the sign in is complete, the scanner CLI receives an authorization token. This authorization token is stored in underlying Operating System (OS) secure storage, such as Mac Keychain and Windows Credential Manager.

One authentication is completed, specific resources in a IaC file/directory are extracted via the parser and stored in a database, for example an SQLite database. The database can be created at the start of the scan or be existing. The parser recursively looks up each file, extracts resource models, and evaluates functions. The functions being written in respective template files. This can include variable replacement, remote module download, number extraction, etc.

Once the parsing is completed, the policy engine is invoked. The policy engine component internally maintains security policies as Structured Query Language (SQL) expressions in a database, again the database can be an SQLite database. In various embodiments, the SQL expressions for each policy are derived from high-level policy definitions that are common across all posture control cases and application scenarios, i.e., from a policy catalog in the cloud-based system. In various embodiments, for an on premises IaC module, posture control cloud services compile each policy into SQLite compatible queries from the universal source language for policy definition. The policy engine can be configured to download the policies from the posture control cloud (i.e., posture control cloud service) and store them in the database. These policies are evaluated for each and every resource and the result of the evaluation is persisted in the database.

In various embodiments, the CLI can read the findings and display the aggregate information along with details on the customer terminal. These findings and extracted resources are uploaded to the posture control cloud (posture control platform) for further processing, and to display them to posture control platform users. The CLI can support a plurality of formats for emitting the results including human readable, Java Script Object Notation (JSON), YAML, Static Analysis Results Interchange Format (SARIF), etc. The CLI also supports displaying remedial actions and recommended procedures for issues detected on the terminal.

Figure 7:
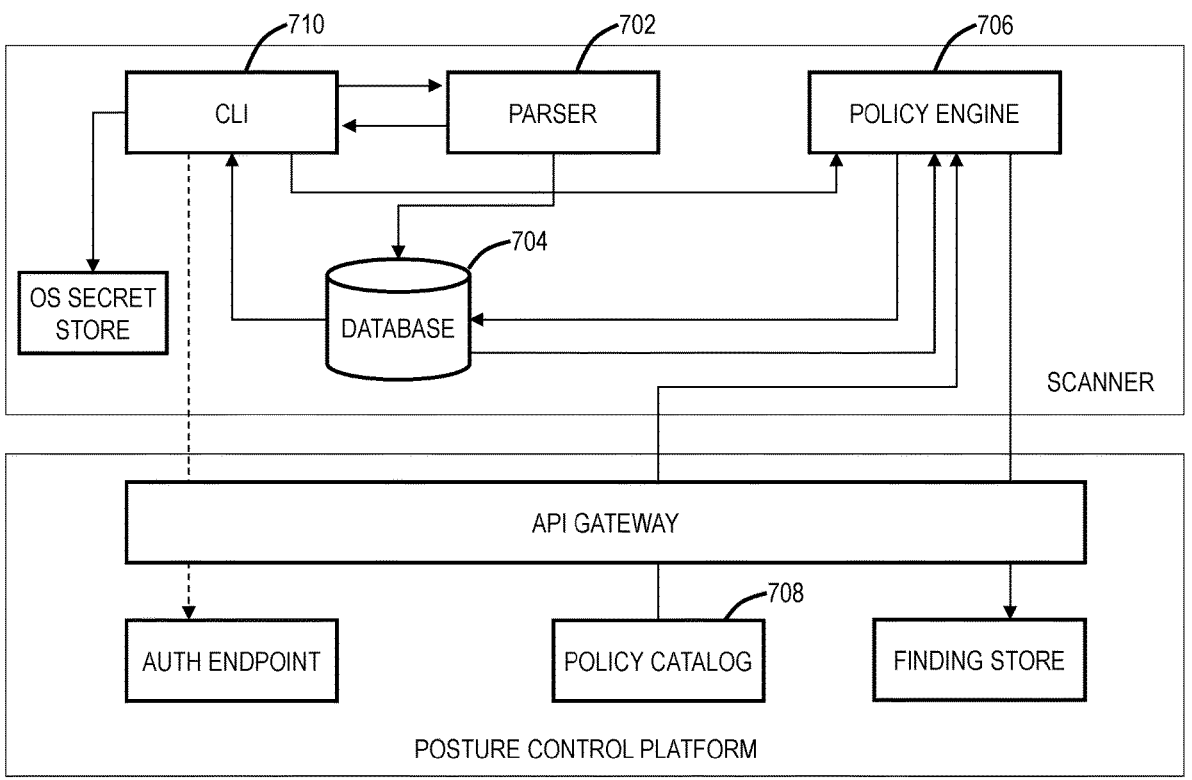
FIG. 7 is a network diagram of the present IaC scanner and associated components.

FIG. 7 is a network diagram of the present IaC scanner and associated components. Again, once authenticated, the resources in an IaC file/directory will be extracted with the parser 702 and stored in an SQLite database 704 which can be created at the start of the scan. The parser 702 will recursively lookup each file and extract the resource models while also evaluating functions which are written in respective template files. Again, the policy engine 706 is invoked which internally maintains security policies as SQL Expressions in the database 704. The SQL expressions for each policy are derived from policy definitions in a policy catalog 708. The policy engine 706 will download these polices and store them in the database 704. The CLI 710 reads the findings and displays the aggregate information along with details on a customer terminal.

The present disclosure provides systems and methods which improve security, enhance consistency and repeatability, allow for faster identification and resolution of security issues, and increase compliance. Regular security scanning can help identify security vulnerabilities in code, infrastructure, and configuration allowing such vulnerabilities to be quickly remediated before they can be exploited. Repeating scans on developer machines ensure that the risk of human error or missed security issues are reduced. These IaC security scans can be performed automatically as part of the development pipeline, allowing security issues to be identified and resolved quickly. Further, performing regular security scanning can help organizations meet regulatory and compliance requirements, such as Center for Internet Security (CIS), and Payment Card Industry Data Security Standard (PCI DSS), by demonstrating that security practices are being followed.

Figure 8:
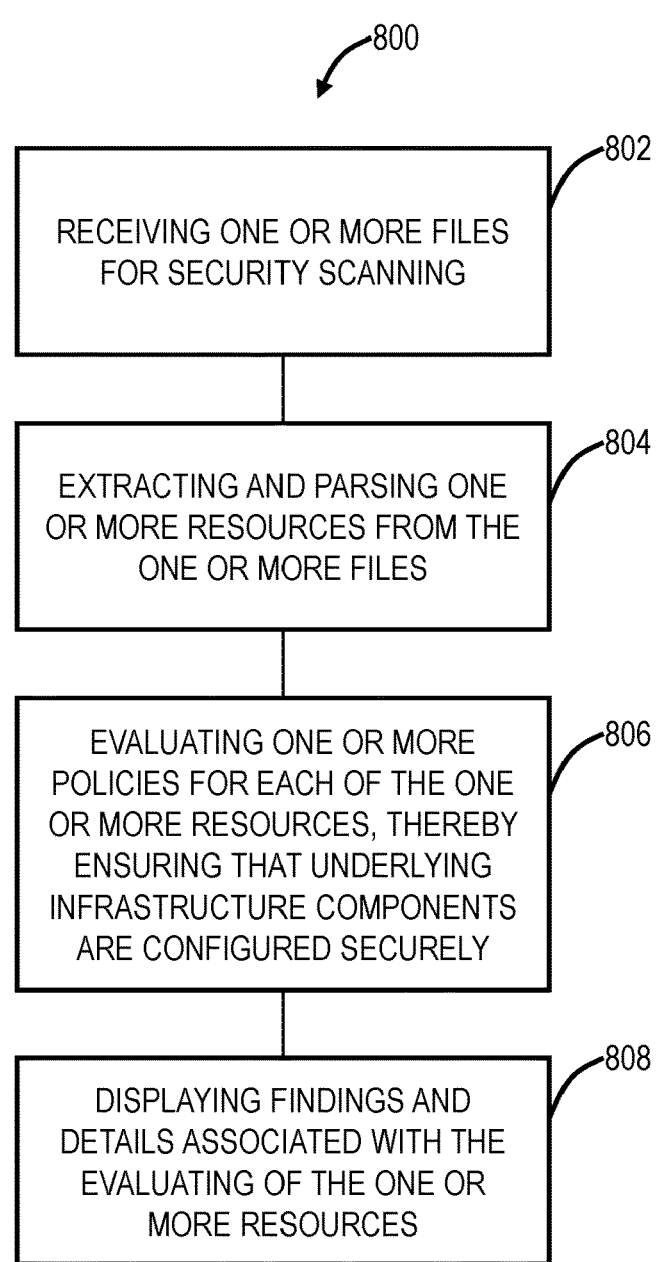
FIG. 8 is a flowchart of a process for enforcing an IaC scanner.

FIG. 8 is a flowchart of a process 800 for enforcing an IaC scanner. Various embodiments include receiving one or more files for security scanning (step 802); extracting and parsing one or more resources from the one or more files (step 804); evaluating one or more policies for each of the one or more resources, thereby ensuring that underlying infrastructure components are configured securely (step 806); and displaying findings and details associated with the evaluating of the one or more resources (step 808).

The process 800 can further include wherein the one or more files are received from a user, wherein the steps further include authenticating the user prior to the receiving. Resources can be stored in a database prior to the evaluating. The database can be created when the one or more files are received. The one or more files include one or more Infrastructure as Code (IaC) files. The one or more policies can be maintained as Structured Query Language (SQL) expressions in a database. The SQL expressions are derived from policy definitions retrieved from a posture control platform in a cloud-based system. Results of the evaluating can be persisted in a database. The findings and resources can be uploaded to a posture control platform for display and further processing. The findings include security issues associated with the one or more resources, and the details include recommended and remedial procedures for the security issues.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:
receiving one or more Infrastructure as Code (IaC) files for security scanning from a user, the receiving including authenticating the user via a posture control platform to obtain an authorization token;
extracting and parsing, by an IaC parser, one or more resources from the one or more IaC files, the extracting including recursively evaluating functions within template files;
storing the extracted resources in a database created at the start of the scanning, wherein the database is locally maintained on a developer machine,
evaluating, by a policy engine, one or more policies for each of the one or more resources, the policies being maintained as Structured Query Language (SQL) expressions compiled from universal policy definition retrieved from the posture control platform;
persisting results of the evaluating in the database; and
displaying findings and details associated with the evaluating of the one or more resources, the findings including recommended remedial procedures, and uploading the findings and the one or more resources to the posture control platform for further processing and graphical visualization.

2. The method of claim 1, wherein the authenticating includes storing an authorization token in secure operating system storage.

3. The method of claim 1, wherein resources are stored in a database prior to the evaluating.

4. The method of claim 3, wherein the database is created when the one or more files are received.

5. The method of claim 1, wherein the one or more policies are maintained as Structured Query Language (SQL) expressions in a database, the SQL expressions being automatically compiled from a universal source policy language into SQLite-compatible queries for local execution on a developer machine.

6. The method of claim 5, wherein the SQL expressions are derived from policy definitions retrieved from a posture control platform in a cloud-based system.

7. The method of claim 1, wherein results of the evaluating are persisted in a database.

8. The method of claim 1, wherein the findings and resources are uploaded to a posture control platform for display and further processing, including correlation with multi-cloud configuration management databases (CMDBs) to identify misconfigurations, excessive permissions, or correlated risks across build-time and run-time environments.

9. The method of claim 1, wherein the findings include security issues associated with the one or more resources, and the details include recommended and remedial procedures for the security issues.

10. A non-transitory computer-readable medium comprising instructions that, when executed, cause one or more processors to perform steps of:

receiving one or more Infrastructure as Code (IaC) files for security scanning from a user, the receiving including authenticating the user via a posture control platform to obtain an authorization token;

extracting and parsing, by an IaC parser, one or more resources from the one or more IaC files, the extracting including recursively evaluating functions within template files;

storing the extracted resources in a database created at the start of the scanning, wherein the database is locally maintained on a developer machine;

evaluating. by a policy engine, one or more policies for each of the one or more resources, the policies being maintained as Structured Query Language (SQL) expressions compiled from universal policy definitions retrieved from the posture control platform;

persisting results of the evaluating in the database; and displaying findings and details associated with the evaluating of the one or more resources, the findings including recommended remedial procedures, and uploading the findings and the one or more resources to the posture control platform for further processing and graphical visualization.

11. The non-transitory computer-readable medium of claim 10, wherein the authenticating includes storing an authorization token in secure operating system storage.

12. The non-transitory computer-readable medium of claim 10, wherein resources are stored in a database prior to the evaluating.

13. The non-transitory computer-readable medium of claim 12, wherein the database is created when the one or more files are received.

14. The non-transitory computer-readable medium of claim 10, wherein the one or more policies are maintained as Structured Query Language (SQL) expressions in a database, the SQL expressions being automatically compiled from a universal source policy language into SQLite-compatible queries for local execution on a developer machine.

15. The non-transitory computer-readable medium of claim 14, wherein the SQL expressions are derived from policy definitions retrieved from a posture control platform in a cloud-based system.

16. The non-transitory computer-readable medium of claim 10, wherein results of the evaluating are persisted in a database.

17. The non-transitory computer-readable medium of claim 10, wherein the findings and resources are uploaded to a posture control platform for display and further processing, including correlation with multi-cloud configuration management databases (CMDBs) to identify misconfigurations, excessive permissions, or correlated risks across build-time and run-time environments.

18. The non-transitory computer-readable medium of claim 10, wherein the findings include security issues associated with the one or more resources, and the details include recommended and remedial procedures for the security issues.

* * * * *